United States Patent [19]

Höhlein et al.

[11] Patent Number: 4,894,430
[45] Date of Patent: Jan. 16, 1990

[54] NEW POLYESTER POLYOLS AND THEIR USE AS POLYOL COMPONENT IN TWO-COMPONENT POLYURETHANE LACQUERS

[75] Inventors: Peter Höhlein, Kempen; Hans-Joachim Höfer; Josef Pedain, both of Cologne; Manfred Schönfelder, Leverkusen, all of Fed. Rep. of Germany

[73] Assignee: Bayer Aktiengesellschaft, Leverkusen, Fed. Rep. of Germany

[21] Appl. No.: 278,056

[22] Filed: Nov. 30, 1988

[30] Foreign Application Priority Data

Dec. 3, 1987 [DE] Fed. Rep. of Germany ....... 3740933

[51] Int. Cl.$^4$ ............................................... C08G 18/62
[52] U.S. Cl. ....................................... 528/75; 528/303; 560/217; 560/224
[58] Field of Search ................... 528/75, 303; 560/217, 560/224

[56] References Cited

U.S. PATENT DOCUMENTS 4,656,243 4/1987 Pedain et al. ..................... 528/302

OTHER PUBLICATIONS

Lackkunstharze by Hans Wagner/Hans Frederich Sarx, Carl Hanser Verlag, pp. 153–173, 1971.

Primary Examiner—Maurice J. Welsh
Attorney, Agent, or Firm—Joseph C. Gil; Thomas W. Roy

[57] ABSTRACT

The present invention is directed to polyester polyols in the hydroxyl number range of about 80 to 250 which are based on reaction products of (a) about 52 to 60 mole % of a polyol component with
(b) about 40 to 48 mole % of dicarboxylic acid component, characterized in that (a) the polyol component is based on (i) about 2 to 30 mole % of at least one dihydric aliphatic alcohol which has at least two carbon atoms and is different from neopentyl glycol, (ii) about 5 to 40 mole % of at least one aliphatic alcohol which is at least trihydric and has at least 3 carbon atoms, (iii) about 20 to 60 mole % of bis-(hydroxymethyl)-cyclohexane and (iv) about 10 to 50 mole % of neopentyl glycol, and (b) the dicarboxylic acid component is based on (v) about 50 to 99 mole % of at least one aliphatic, saturated dicarboxylic acid or an anhydride of such an acid containing at least 2 carbon atoms and (vi) about 0.5 to 50 mole % of at least one aliphatic unsaturated dicarboxylic acid or its anhydride having at least 4 carbon atoms, the percentages under (a) and (b) adding up to 100.

The present invention is also directed to the use of these polyester polyols as a binder component for two-component polyurethane lacquers containing lacquer polyisocyanates for the production of lacquer coats on molded plastic parts.

5 Claims, No Drawings

NEW POLYESTER POLYOLS AND THEIR USE AS POLYOL COMPONENT IN TWO-COMPONENT POLYURETHANE LACQUERS

BACKGROUND OF THE INVENTION

1. Field of the Invention

This invention relates to new polyester polyols based on selected starting materials and to their use in combination with certain lacquer polyisocyanates as binders or binder components in two-component polyurethane lacquers for producing coatings with high resistance to yellowing on molded plastic parts 2. Description of the Prior Art It has long been known to coat relatively rigid substrates such as metal or wood with two-component polyurethane lacquers based on polyesters, polyethers or polyacrylates containing hydroxyl groups and organic polyisocyanates The lacquer coatings obtained are distinguished particularly by their excellent hardness, very firm adherence and high weather resistance. The chemical basis of these lacquers and coatings is described inter alia in "Lackunstharze", Hans Wagner/Hans Friederich Sarx, Carl Hanser Verlag, Munich, pages 153 to 173, 1971.

The two-component polyurethane lacquers known in the art, however, frequently give rise to highly crosslinked lacquer coats whose elasticity and resistance to yellowing are frequently insufficient for coatings on flexible substrates, especially when exposed to shortwave UV light.

It is particularly in the motor car industry that flexible plastic parts are increasingly used for greater safety. In some countries, for example, motor vehicles are required to be equipped with bumpers which will not be damaged by impact against a solid barrier at a particular speed (e.g. 5 mph) and functional parts such as headlights, blinkers, doors and bonnets must also remain undamaged. In many countries, these and other more stringent requirements have caused metal bumpers to be discarded in the construction of motor vehicles and replaced by complete front and rear parts of highly flexible materials which fulfill the requirement for undamaged restoration of the bumpers after impact (avoiding damage in minor accidents).

Highly flexible plastics which have proved suitable for this purpose include inter alia semi-rigid elastomeric polyurethanes (e.g. Bayflex systems of Bayer AG, Leverkusen) which are produced from two-component polyurethane-forming mixtures by the reaction injection molding process in closed molds, optionally with foaming; thermoplastic polyurethanes (e.g. Desmopan of Bayer AG or Texin of Mobay Corporation, Pittsburgh, USA) produced by injection molding as well as many different types of rubbers.

The plastic parts based on these chemical materials, which have been used for some years now in the state of the art for the manufacture of motor vehicles, are relatively large and therefore to a large extent determine the appearance of the vehicle. It is therefore necessary to lacquer these parts and it is also necessary to protect the surfaces of these plastics as they are degraded by the influence of weather.

Plastic parts which are less highly elastic are also required to be covered with elastic lacquer coats to prevent mechanical damage. Thus, for example, rigid but tough thermoplasts are required to be lacquered with highly elastic, extremely resistant lacquers to ensure that mechanical damage and other external influences will not produce cracks in the lacquer film which could be propagated through the solid plastic.

Highly flexible lacquers which are perfectly satisfactory in their elasticity and their flexibility in the cold can be obtained from two-component systems known in the art, especially when certain polyhydroxyl polyesters which are synthesized predominantly from aliphatic diols and have a hydroxy functionality not significantly above 2 are used as the main polyol component. The disadvantage of these two-component polyurethane lacquers based on such polyester diols and the conventional lacquer polyisocyanates lies in the fact that the lacquer coats obtained have insufficient weather resistance and resistance to chalking so that the gloss retention of the coatings obtained from such lacquer systems is entirely unsatisfactory. Another particular disadvantage is the tendency of such lacquer systems to undergo yellowing when exposed to shortwave UV light. This applies particularly to the systems according to DE-OS 3,421,122 which in other respects substantially fulfills the requirements of elastic synthetic resin lacquers.

It was therefore an object of the present invention to provide a new two-component polyurethane lacquer system which would satisfy these special requirements and would in particular be optimally suited for lacquering elastic parts made of plastic material. The new lacquer system should in particular also satisfy the following requirements:

1. Film surfaces free from yellowing under the action of shortwave UV light:
   The lacquer film must be able to withstand irradiation with shortwave UV light (wavelengths <400 nm) for a period of at least 200 hours without yellowing.
2. Low temperature elasticity:
   The film must not break under impact even at a temperature of −40° C. The mechanical properties of the plastic should as far as possible be unimpaired by the lacquering.
3. Good gloss retention:
   The lacquer film should be highly durable on the plastic parts. It must not be degraded more rapidly by weather conditions than the car body.
4. No increase in brittleness under exposure to the weather:
   The film must not subsequently become brittle even after prolonged exposure to weather conditions, i.e. the low temperature elasticity should not be impaired by exposure to the weather.
5. Low drying temperature:
   Such large plastic parts have only a limited resistance to bending under heat. The drying temperatures and times should therefore be as low as possible for this reason as well as for saving energy.
6. Possibility of repair:
   The drying conditions of such a system should be suitable not only for initial lacquering but also for repair lacquering at 80° C. or room temperature.

It has now surprisingly been found that these objects may be achieved by using the polyester polyols according to the invention (described in more detail below) based on selected starting materials as the polyhydroxyl component in two-component polyurethane lacquers.

SUMMARY OF THE INVENTION

The present invention is directed to polyester polyols in the hydroxyl number range of about 80 to 250 which are based on reaction products of
 (a) about 52 to 60 mole % of a polyol component with
 (b) about 40 to 48 mole % of dicarboxylic acid component, characterized in that
 (a) the polyol component is based on (i) about 2 to 30 mole % of at least one dihydric aliphatic alcohol which has at least two carbon atoms and is different from neopentyl glycol, (ii) about 5 to 40 mole % of at least one aliphatic alcohol which is at least trihydric and has at least 3 carbon atoms, (iii) about 20 to 60 mole % of bis-(hydroxymethyl)-cyclohexane and (iv) about 10 to 50 mole % of neopentyl glycol, and
 (b) the dicarboxylic acid component is based on (v) about 50 to 99 mole % of at least one aliphatic, saturated dicarboxylic acid or an anhydride of such an acid containing at least 2 carbon atoms and (vi) about 0.5 to 50 mole % of at least one aliphatic unsaturated dicarboxylic acid or its anhydride having at least 4 carbon atoms,
the percentages under (a) and (b) adding up to 100.

The present invention is also directed to the use of these polyester polyols as a binder component for two-component polyurethane lacquers containing lacquer polyisocyanates for the production of lacquer coats on molded plastic parts.

DETAILED DESCRIPTION OF THE INVENTION

The exceptional suitability of the polyester polyols for use in two-component polyurethane lacquers is due to the choice of the starting materials for the polyester polyols and their quantitative proportions. The polyester polyols according to the invention have hydroxyl numbers within the range of about 80 to 250, preferably about 120 to 200, acid numbers below about 12, preferably about 1.0 to 10, and an average molecular weight, calculated from the stoichiometric proportions of the starting materials used, of about 800 to 10,000, preferably about 800 to 5000. The polyester polyols according to the invention are highly viscous, colorless, clear resins which form clear solutions in lacquer solvents. Examples of such solvents include hydrocarbons such as toluene, xylene or higher alkylbenzenes; esters such as ethyl acetate, butyl acetate, methyl glycol acetate, ethyl glycol acetate or methoxypropylacetate: and ketones such as methyl ethyl ketone or methyl isobutyl ketone.

It is also an essential part of the invention that the polyhydroxy polyester polyols according to the invention have been prepared from the above-mentioned starting components (a) and (b). Polyol component (a) is composed of the individual components (i) to (iv).

Component (i) is based on dihydric aliphatic alcohols with at least 2, preferably 2 to 6 carbon atoms, with the exception of neopentyl glycol. Examples include ethylene glycol, propanediol-(1,2) and -(1,3), butanediol-(1,2) and -(1,4), pentanediol-(1,5) and, most preferably, hexanediol-(1,6). Mixtures of such diols may also be used as component (i). Component (i) is used in a quantity of about 2 to 30 mole %, preferably about 10 to 30 mole %, based on the total quantity of component (a).

Component (ii) is based on aliphatic alcohols have functionalities of 3 or more and have at least 3, preferably 3 to 5 carbon atoms, e.g. trimethylolpropane, glycerol and/or pentaerythritol. Component (ii) is used in quantities of about 5 to 40 mole %, preferably about 10 to 35 mole % based on the total quantity of component (a).

Component (iii) is based on 1,2-, 1,3- and in particular 1,4-bis-(hydroxymethyl)-cyclohexane. Component (iii) is used in quantities of about 20 to 60 mole %, preferably about 25 to 55 mole %, based on the total quantity of component (a).

Component (iv) is based on neopentyl glycol (2,2-dimethyl-propanediol-(1,3)). Component (iv) is used in quantities of about 10 to 50 mole %, preferably about 15 to 45 mole %, based on the total quantity of component (a).

The dicarboxylic acid component (b) is based on a mixture of individual components (v) and (vi). The mixture contains about 50 to 99.5 mole %, preferably about 60 to 98 mole % of component (v) and about 0.5 to 50 mole %, preferably about 2 to 50 mole %, of component (vi), based on the total quantity of component (b).

Component (v) is based on an aliphatic, saturated dicarboxylic acid having at least 2, preferably 4 to 6 carbon atoms, e.g. oxalic acid, succinic acid, glutaric acid and especially adipic acid. Mixtures of such acids may, of course, also be used. It would be possible in principle but is not customary to use the intramolecular acid anhydrides of these acids.

Component (vi) is based on aliphatic, unsaturated dicarboxylic acids or their anhydrides having at least 4, preferably 4 or 5 carbon atoms, e.g. fumaric acid, maleic acid or itaconic acid or the anhydrides of these acids. Maleic acid anhydride is particularly preferred as component (vi). Any mixtures of such acids or acid anhydrides may also be used as component (vi).

The percentages in components (a) and (b) always add up to 100. The polyester polyols are prepared from about 52 to 60 mole %, preferably about 52 to 58 mole % of component (a) and about 40 to 48 mole %, preferably about 42 to 48 mole % of component (b), the percentages again adding up to 100.

Preparation of the polyesters according to the invention is carried out in known manner by methods such as those which have been described in detail, for example in "Ullmanns Encyclopadie der Technischen Chemie", Verlag Chemie Weinheim, 4th Edition (1980), Volume 19, pages 61 et seq., or by H. Wagner and H. F. Sarx in "Lackkunstharze", Carl Hanser Verlag, Munich (1971), pages 86 to 152. The esterification may be carried out in the presence of a catalytic quantity of a conventional esterification catalyst such as an acid, base or transition metal compound, e.g. titanium tetrabutylate, at about 80 to 260° C., preferably about 100° to 230° C. The esterification reaction is continued until the desired hydroxyl number and acid number are obtained.

When the polyester polyols are used according to the invention as polyhydroxyl components, they may be mixed with other organic polyhydroxyl compounds known from polyurethane lacquer technology. These other polyhydroxyl compounds may be conventional polyester, polyether or polyacrylate polyols. If the polyester polyols which are essential to this invention are used in combination with other organic polyhydroxyl compounds, the latter are preferably polyacrylate polyols known in the art.

Polyacrylate polyols which are suitable as components of such a mixture include copolymers of 2- hydroxyethyl- and/or 2- or 3-hydroxypropyl-(meth)acrylate with other olefinically unsaturated monomers such as methyl acrylate, methyl methacrylate, styrene, acrylic acid, acrylonitrile, methacrylonitrile or the like and are soluble in the lacquer solvents of the type exemplified above. The hydroxyl group content of these polyacrylate polyols is generally about 1 to 5% by weight.

For the purpose of this invention, the polyester polyols according to the invention may be mixed with up to about 90 hydroxyl equivalent percent, preferably up to about 50 hydroxyl equivalent percent, based on all the polyhydroxyl compounds, of other polyols of the type exemplified above. Most preferably the polyester polyols according to the invention are preferably used as the only polyol component for the purpose of this invention.

The compounds to be reacted with the polyol component when the polyester polyols are used according to the invention are the usual "lacquer polyisocyanates", i.e., primarily the well-known urethane group-containing or in particular biuret group-containing or isocyanate group-containing modification products of simple diisocyanates such as 1,6-diisocyanatohexane, 1-isocyanato-3,3,5-trimethyl-5-isocyanatomethyl-cyclohexane (isophorone diisocyanate), 2,4-diisocyanatotoluene and mixtures thereof with up to 35% by weight, based on the total mixture, of 2,6-diisocyanatotoluene or mixtures of these diisocyanates. Particularly preferred among these "lacquer polyisocyanates" are those which contain aliphatically and/or cycloaliphatically bound isocyanate groups.

The lacquer polyisocyanates containing urethane groups include in particular the reaction products of 2,4- and optionally 2,6-diisocyanatotoluene with subequivalent quantities of trimethylolpropane or mixtures thereof with simple diols such as the isomeric propanediols or butanediols. The preparation of such urethane-containing lacquer polyisocyanates in a virtually monomer-free form is described, for example, in DE-PS 1,090,196.

Biuret group-containing lacquer polyisocyanates, which are particularly preferred for the use according to the invention, include in particular those based on 1,6-diisocyanatohexane, the preparation of which has been described, for example, in EP-B1-000 3505, DE-PS 1,101,394, US-PS 3,358,010 and US-PS 3,903,127.

The polyisocyanates containing isocyanurate groups, which are also preferred isocyanates, include in particular the isocyanurate-containing trimers or mixed trimers of the diisocyanates exemplified above, e.g. the isocyanurate-containing polyisocyanates based on diisocyanatotoluene disclosed in GB-PS 1,060,430, GB-PS 1,506,373 and GB-PS 1,485,564, the mixed trimers of diisocyanatotoluene with 1,6-diisocyanatohexane, which may be obtained, for example, according to DE-PS 1,644,809 or DE-OS 3,144,672, and in particular the aliphatic and aliphatic-cycloaliphatic trimers or mixed trimers based on 1,6-diisocyanato-hexane and/or isophorone diisocyanate, which are obtainable, for example, according to U.S. Pat. No. 4,324,879, U.S. Pat. No. 4,288,586, DE-OS 3,100,262, DE-OS 3,100,263, DE-OS 3,033,860 or DE-OS 3,144,672. The lacquer polyisocyanates suitable for the use according to the invention generally have an isocyanate content of about 5 to 25% by weight, and the residue of monomeric isocyanate used for their preparation preferably amounts to less than 2% by weight. Mixtures of the lacquer polyisocyanates exemplified above may also be used.

In the two-component polyurethane lacquers according to the invention, the polyol components and the polyisocyanate components are present in quantities corresponding to an equivalent ratio of isocyanate groups to hydroxyl groups of about 10:1 to 1:2, preferably about 1.5:1 to 1:1.2. The two-component binders obtained by mixing the two-components have only a limited processing time of about 2 to 48 hours and are worked up either as such (solvent-free clear lacquers) or, preferably, with the addition of the usual auxiliary agents and additives. These optional auxiliary agents and additives may be added either to the mixture or to the individual components before they are mixed together.

The auxiliary agents and additives include solvents such as ethyl acetate, butyl acetate, methyl ethyl ketone, methyl isobutyl ketone, ethylene glycol monoethylether acetate, methoxypropyl acetate, toluene, xylene, white spirit or mixtures of these solvents. The solvents are added in quantities of up to about 70% by weight, preferably up to about 40% by weight, based on the total mixture.

Other auxiliary agents and additives optionally used include plasticizers such as tricresyl phosphate or phthalic acid diesters or chloroparaffins; pigments and fillers such as titanium dioxide, barium sulphate, chalk and carbon black; catalysts such as N,N-dimethylbenzylamine, N-methylmorpholine, lead octoate or dibutyl tin dilaurate; levelling agents; thickeners; stabilizers such as substituted phenols; organofunctional silanes as bonding promoters; and light protective agents such as sterically hindered amines, e.g. those described in DE-OS 2,417,353 (= U.S. Pat. No. 4,123,418 and U.S. Pat. No. 4,110,304) and DE-OS 2,456,864 (= U.S. Pat. No. 3,993,655 and U.S. Pat. No. 4,221,701). The following compounds are particularly preferred: bis-(1,2,2,6,6-pentamethylpiperidyl-4)-sebacate, bis-(Z,Z,6,6-tetramethylpiperidyl-4-sebacate, n-butyl-(3,5-di-tert.-butyl-4-hydroxybenzyl)-malonic acid-bis-(1,2,2,6,6-pentamethylpiperidyl-4)-ester.

The moisture adhering to the fillers and pigments may be removed by preliminary drying or by means of water absorbent substances such as molecular sieve zeolites.

Drying of the lacquer films obtained according to the invention may be carried out at room temperature and does not require an increase in temperature to obtain the above mentioned optimum properties; however, since drying proceeds relatively slowly at room temperature it is in many cases advisable to raise the temperature to about 60° to 120° C., preferably about 80° to 100° C. for a period of about 20 to 40 minutes. Although a higher drying temperature and therefore a shorter stoving process would be possible, this entails the risk of deformation of the plastic parts which are coated with the lacquer.

The lacquers to be used according to the invention are suitable especially for lacquering plastics but also for lacquering metals and other substrates. They are particularly suitable for lacquering flexible plastic parts such as those used in the construction of motor vehicles.

The lacquers to be used according to the invention are equally suitable for plastics and for metals. They are especially suitable for lacquering structures such as the external parts of motor vehicles which are produced from plastics and metal parts by the modern mixed construction method. The special advantages of the lacquers used according to the invention favor this on-line lacquering of the external parts of motor vehicles since (1) hardening of the lacquer films can take place at low temperatures so that the plastics need not be subjected to undue temperatures and (2) the lacquer films obtained have excellent weather resistance and elasticity so that decorative lacquers remain unchanged for a long period and can withstand shocks and impacts without damage. The excellent resistance to stone chipping of motor car top coat lacquers produced according to this invention should be particularly noted. The lacquer films obtained from the two-component lacquers used according to the invention are capable of optimally fulfilling two opposing requirements, i.e., excellent low temperature elasticity and high gloss retention with resistance to yellowing on exposure to low wavelength light such as shortwave UV light.

The lacquers used according to the invention may, of course, be applied to the substrates by any conventional methods of lacquer technology such as brush coating, spraying or immersion. The lacquers according to the invention are suitable both for primer coats and for interlayers as well as for the formation of top layers on the substrates to be lacquered.

The invention is further illustrated but is not intended to be limited by the following examples in which all parts and percentages are by weight unless otherwise specified.

EXAMPLES

General method of preparation for polyester polyols

The polyols and the unsaturated dicarboxylic acid(s) or anhydride(s) were weighed into a reactor equipped with a stirrer, heating means, automatic temperature control, column and receiver and heated to 100° to 150° C. while a stream of nitrogen was passed through the inhomogeneous mixture of raw materials. After addition of the remaining dicarboxylic acids, the mixture of raw materials was heated to 200° C. within 4 to 8 hours with stirring and while a stream of nitrogen was passed through. The temperature measured at the head of the column was kept not higher than 105° C. At this temperature, the melt became homogeneous and clear. As soon as the temperature at the head of the column fell below 90° C., the column was removed and the substance was condensed to an acid number below 2 mg KOH/g of substrate under a faster stream of nitrogen.

Colorless resins were obtained. These resins were dissolved in methoxypropyl acetate or butyl acetate or mixtures thereof.

The composition and data of the individual polyesters prepared by this method are given in Examples 1 to 9. The quantities given in "mole" do not refer to the absolute number of the "moles" but reflect molar ratio between the various components as is clear from the weights given in 37 g".

| Example 1 (according to the invention) | |
|---|---|
| Polyester of | 500 g |
| 1.0 mole of hexane-1,6-diol | |
| 1.0 mole of trimethylolpropane | 567 g |
| 1.5 mole of 1,4-bis-(hydroxymethyl)-cylohexane | 915 g |
| 1.5 mole of neopentyl glycol | 662 g |
| 3.92 mole of adipic acid | 2426 g |
| 0.08 mole of maleic acid anhydride | 33 g |
| Hydroxyl number: 149 | |
| Acid number: 1.8 | |
| Example 2 (according to the invention) | |
| 1.0 mole of hexane-1,6-diol | 509 g |
| 1.0 mole of trimethylolpropane | 578 g |
| 1.5 mole of 1,4-bis-(hydroxymethyl)-cyclohexane | 931 g |
| 1.0 mole of neopentyl glycol | 449 g |
| 0.5 mole of ethylene glycol | 134 g |
| 3.92 mole of adipic acid | 2487 g |
| 0.08 mole of maleic acid anhydride | 33 g |
| Hydroxyl number: 156 | |
| Acid number: 2.2 | |
| Example 3 (according to the invention) | |
| 1.0 mole of hexane-1,6-diol | 502 g |
| 1.0 mole of trimethylolpropane | 569 g |
| 1.5 mole of 1,4-bis-(hydroxymethyl)-cyclohexane | 918 g |
| 1.5 mole of neopentyl glycol | 665 g |
| 3.8 mole of adipic acid | 2350 g |
| 0.2 mole of maleic acid anhydride | 90 g |
| Hydroxyl number: 141 | |
| Acid number: 1.9 | |
| Comparison 1 | |
| 4.0 mole of hexane-1,6-diol | 1921 g |
| 1.0 mole of trimethylolpropane | 545 g |
| 2.5 mole of isophthalic acid | 1688 g |
| 1.0 mole of adipic acid | 594 g |
| 0.5 mole of phthalic acid anhydride | 301 g |
| Hydroxyl number: 147 | |
| Acid number: 1.8 | |
| Example 4 (according to the invention) | |
| 1.0 mole of hexane-1,6-diol | 504 g |
| 1.0 mole of trimethylolpropane | 571 g |
| 1.5 mole of 1,4-bis-(hydroxymethyl)-cyclohexane | 921 g |
| 1.5 mole of neopentyl glycol | 667 g |
| 3.71 mole of adipic acid | 2290 g |
| 0.29 mole of maleic acid anhydride | 136 g |
| Hydroxyl number: 140 | |
| Acid number: 1.8 | |
| Comparison 2 | |
| 4.0 mole of hexane-1,6-diol | 1918 g |
| 1.0 mole of trimethylolpropane | 545 g |
| 0.95 mole of isophthalic acid | 636 g |
| 0.95 mole of adipic acid | 560 g |
| 1.9 mole of hexahydrophthalic acid anhydride | 1181 g |
| 0.5 mole of maleic acid anhydride | 91 g |
| Hydroxyl number: 137 | |
| Acid number: 1.9 | |
| Example 5 (according to the invention) | |
| 0.5 mole of hexane-1,6-diol | 259 g |
| 0.5 mole of butane-1,4-diol | 198 g |
| 1.0 mole of trimethylolpropane | 589 g |
| 1.5 mole of 1,4-bis-(hydroxymethyl)-cyclohexane | 949 g |
| 1.0 mole of neopentyl glycol | 458 g |
| 0.5 mole of ethylene glycol | 136 g |
| 3.8 mole of adipic acid | 2441 g |
| 0.2 mole of maleic acid anhydride | 86 g |
| Hydroxyl number: 162 | |
| Acid number: 2.2 | |
| Example 6 (according to the invention) | |
| 1.0 mole of hexane-1,6-diol | 507 g |
| 1.0 mole of trimethylolpropane | 575 g |
| 1.5 mole of 1,4-bis-(hydroxymethyl)-cyclohexane | 927 g |
| 1.5 mole of neopentyl glycol | 671 g |
| 3.51 mole of adipic acid | 2169 g |
| 0.49 mole of maleic acid anhydride | 228 g |
| Hydroxyl number: 153 | |
| Acid number: 1.8 | |
| Example 7 (according to the invention) | |
| 1.0 mole of hexane-1,6-diol | 510 g |
| 0 mole of trimethylolpropane | 579 g |
| 1.5 mole of 1,4-bis-(hydroxymethyl)-cyclohexane | 934 g |
| 1.5 mole of neopentyl glycol | 676 g |
| 3.2 mole of adipic acid | 2021 g |
| 0.8 mole of maleic acid anhydride | 339 g |
| Hydroxyl number: 156 | |
| Acid number: 2.0 | |
| Example 8 (according to the invention) | |
| 1.0 mole of hexane-1,6-diol | 516 g |
| 1.0 mole of trimethylolpropane | 586 g |
| 1.5 mole of 1,4-bis-(hydroxymethyl)-cyclohexane | 945 g |
| 1.5 mole of neopentyl glycol | 684 g |
| 2.8 mole of adipic acid | 1789 g |

-continued

| | |
|---|---|
| 1.2 mole of maleic acid anhydride | 515 g |
| Hydroxyl number: 145 | |
| Acid Number: 2.1 | |
| Example 9 (according to the invention) | |
| 1.0 mole of hexane-1,6-diol | 538 g |
| 1.0 mole of trimethylolpropane | 611 g |
| 1.0 mole of 1,4-bis-(hydroxymethyl)-cyclohexane | 657 g |
| 1.5 mole of neopentyl glycol | 713 g |
| 3.8 mole of adipic acid | 2532 g |
| 0.2 mole of maleic acid anhydride | 90 g |
| Hydroxyl number: 108 | |
| Acid number: 1.7 | |

Example 10 (Use)

This example describes the preparation of lacquers based on the polyester polyols of Examples 1 to 9, their application and the tests carried out on the resulting lacquer films.

White lacquers were prepared for assessing the general lacquer properties. Various additives and a white pigment were added to the polyester polyols from Examples 1 to 9 and the polyester polyols were then triturated on a red devil.

A lacquer polyisocyanate was then added in such a quantity that the NCO/OH ratio after its addition was about 1.2:1. The "lacquer isocyanate" was a biuret polyisocyanate based on 1,6-diisocyanatohexane and based on a mixture of N,N',N"-tris-(isocyanatohexyl)-biuret with its higher homologs dissolved as a 75% solution in ethyl glycol acetate/xylene (volumetric ratio =1:1); isocyanate content of the solution 16.8% by weight, proportion of free 1,6-diisocyanatohexane in the solution: less than 0.7%.

The following proportions of additives, based on the solid resin (sum of solid content of polyol and polyisocyanate) were used:

TABLE 1

| Components | % by weight solid to solid |
|---|---|
| Zinc octoate (10% in 1-methoxypropyl acetate-2) | 0.2 |
| Silicone oil as levelling agent (Baysilone lacquer additive OL 17 of Bayer AG; 10% in 1-methoxypropyl acetate-2) | 0.1 |
| (Tinuvin 292 (light protective agent of Ciba-Geigy, Basle; 10% in xylene) | 1.0 |
| (Tinuvin 900 (light protective agent of Ciba-Geigy, Basle; 10% in xylene) | 1.0 |
| Titanium dioxide (rutile type; Kronos 2160 of Kronos-Titan, Leverkusen) | 60.0 |
| Agents for preventing settling (Bentone 38 of Kronos-Titan, Leverkusen; 10% decomposition in Solvesso/Antiterra U 17:1) | 1.0 |

The solvent used was a mixture of ethyl acetate, 1-methoxypropylacetate-2 and methyl ethyl ketone (1:1:1). It was diluted to the following concentrations:
33 % by weight binder
20 % by weight pigment
about 1 % by weight additive
about 46 % by weight solvent.

The outflow time (DIN 53 211: 4 mm nozzle) was about 18 seconds. At this viscosity, the lacquers are ready for spraying. The pot life inside closed containers was about 60 to 80 hours.

The lacquers were drawn over glass plates (layer thickness about 100 μm of wet film), dried at 80° C. for 45 minutes and stored at room temperature for 14 days. The dry film thickness was about 50 μm.

The Konig hardness (DIN 53 157), the Gardner gloss at 60° (DIN 67 530), the susceptibility to solvent attack by various solvents and the tar resistance were tested. Very good results were obtained throughout.

The lacquers were sprayed on previously primed plastic plates of Bayflex 91 (Bayer AG, Leverkusen) 3 mm in thickness to test the flexibility of the lacquers in the cold. The lacquers were dried at 80° C. for 45 minutes and stored at room temperature for 14 days. The dry film thickness was about 35 μm.

Strips 2 cm in width and 15 cm in length prepared from these samples were stored in a refrigerating chamber for about 30 minutes at various temperatures (room temperature; 5° C.; 0° C., −5° C, ..., −50° C.) and then bent over a 1 inch mandrel at the temperature in the chamber. That temperature at which the lacquer film breaks is taken as a measure of the flexibility at low temperatures. Lacquers prepared from the polyester polyols of Examples 1 to 9 satisfied the highest requirements for elasticity at low temperatures. The lacquer films did not crack even at −50° C.

Short weathering tests for testing the weather resistance of coatings were often carried out to enable rapid comparative assessments to be made. For these tests, the samples were exposed to vigorous conditions of irradiation and moisture which only few materials can withstand without damage. Since good results under these tests are increasingly required nowadays, it was an object of the present invention to find new types of suitable polyester polyols capable of giving rise to lacquers which in addition to their general high level of qualities (elasticity, gloss, chemical resistance, etc.) would have substantially greater resistance under these short weathering conditions than comparable coatings.

It was one of the primary objectives to obtain a high resistance to yellowing under shortwave UV light in the QUV test (QUV accelerated Weathering Tester: test according to ASTM G 53-77).

For this test, clear lacquers based on the polyester polyols of Examples 1 to 9 were applied to aluminum sheets (68 mm×150 mm) which had previously been primed and coated with a white base lacquer. To prepare these clear lacquers, the titanium dioxide and the Bentone antisettling agents used in the formulation of Table 1 were omitted and the solids content was adjusted to about 43% with the solvent mixture. After the lacquers had been sprayed and dried (45 minutes at 80° C.), they were kept at room temperature for 14 days and then tested in the QUV apparatus (Q-Panel Company). The samples were alternately exposed to intensive, unfiltered UV light in the wavelength region of about 280 to 370 nm (maximum at 313 nm) for 4 hours and then exposed to moisture for 4 hours in the dark, and the cycle was repeated over a total period of 200 hours. After the samples had been washed, the total color difference Δ E (compared with an unweathered plate) was determined by means of a colorimeter and the result was taken as a measure of the amount of yellowing which had occurred.

The values obtained for lacquers 1 to 9 prepared from the polyester polyols of Examples 1 to 9 and the Comparison lacquers 1 and 2 based on the polyethers of Comparison Examples 1 and 2 are shown in Table 2.

TABLE 2

| Lacquer No. | 1 | 2 | 3 | Comparison 1 | 4 |
|---|---|---|---|---|---|
| Total color difference Δ E (after 200 h QUV) | 5.0 | 5.2 | 4.9 | 15.8 | 4.6 |

| Lacquer No. | Comparison 2 | 5 | 6 | 7 | 8 | 8 |
|---|---|---|---|---|---|---|
| Total color difference Δ E (after 200 h QUV) | 15.2 | 4.8 | 4.3 | 4.3 | 4.0 | 5.1 |

Discussion of results

Formation of cracks, blisters or patches did not occur in any of the samples. The results of the color measurements demonstrate in particular the excellent resistance of the lacquers according to the invention to UV light in contrast to the comparison lacquers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol having a hydroxyl number of about 80 to 250 and comprising the reaction product of
   (a) about 52 to 60 mole % of a polyol component comprising
      (i) about to 2 to 30 mole % of at least one dihydric aliphatic alcohol other than neopentyl glycol which has at least two carbon atoms,
      (ii) about 5 to 40 mole % of at least one aliphatic alcohol which has three or more hydroxyl groups and at least three carbon atoms,
      (iii) about 20 to 60 mole % of bis-(hydroxymethyl)-cyclohexane and
      (iv) about 10 to 50 mole % of neopentyl glycol and
   (b) about 40 to 48 mole % of a dicarboxylic acid component comprising
      (v) about 50 to 99 mole % of at least one aliphatic, saturated dicarboxylic acid or anhydride of such acid containing at least two carbon atoms and
      (vi) about 0.5 to 50 mole % of at least one aliphatic, unsaturated dicarboxylic acid or an anhydride of such an acid containing at least four carbon atoms,
   the percentages given under (a) and (b) adding up to 100.

2. The polyester polyol of claim 1 wherein component (i) comprises hexane-1,6-diol, component (ii) comprises trimethylolpropane, glycerol, pentaerythritol or mixtures thereof and component (iii) comprises 1,4-bis-(hydroxymethyl)-cyclohexane.

3. The polyester polyol of claim 1 wherein component (v) comprises adipic acid and component (vi) comprises maleic acid, maleic acid anhydride or mixtures thereof.

4. The polyester polyol of claim 2 wherein component (v) comprises adipic acid and component (vi) comprises maleic acid, maleic acid anhydride or mixtures thereof.

5. A two-component polyurethane lacquer for coating flexible substrates which comprises a polyisocyanate component and a polyol component comprising the polyester polyol of claim 1.

* * * * *